(12) United States Patent
Longchamp

(10) Patent No.: US 7,520,534 B2
(45) Date of Patent: Apr. 21, 2009

(54) FENDER MOUNTABLE TO A VEHICLE

(76) Inventor: Gérard Longchamp, 314, rue Principale, St-Alphonse de Granby, Quebec (CA) J0E 2A0

(*) Notice: Subject to any disclaimer, the term of this patent is extended or adjusted under 35 U.S.C. 154(b) by 84 days.

(21) Appl. No.: 11/517,384

(22) Filed: Sep. 8, 2006

(65) Prior Publication Data

US 2007/0057536 A1  Mar. 15, 2007

(30) Foreign Application Priority Data

Sep. 9, 2005 (GB) ................................ 0518396.7

(51) Int. Cl.
B62D 25/18 (2006.01)

(52) U.S. Cl. ..................... 280/847; 280/851; 280/152.2; 280/152.3

(58) Field of Classification Search ................ 280/847, 280/848, 849, 851, 423.1, 160, 154, 156, 280/854, 852, 855, 856, 159, 160.1, 152.2, 280/152.3; 296/190.05, 190.09, 198
See application file for complete search history.

(56) References Cited

U.S. PATENT DOCUMENTS

| | | | | | |
|---|---|---|---|---|---|
| 1,439,599 | A | * | 12/1922 | Baker | 280/847 |
| 1,704,048 | A | * | 3/1929 | Jordan | 280/847 |
| 2,311,941 | A | * | 2/1943 | Gustafson | 280/847 |
| 2,572,342 | A | * | 10/1951 | Huett | 280/847 |
| 2,660,443 | A | * | 11/1953 | Miller | 280/847 |
| 2,774,610 | A | * | 12/1956 | Ratcliffe | 280/847 |
| 2,972,149 | A | * | 2/1961 | Bracesco | 280/847 |
| 3,618,998 | A | * | 11/1971 | Swauger | 296/180.5 |
| 3,876,229 | A | * | 4/1975 | Kohn et al. | 280/847 |
| 3,922,003 | A | * | 11/1975 | Lea | 280/851 |
| 4,097,085 | A | * | 6/1978 | Nelson | 296/190.05 |
| 4,268,053 | A | * | 5/1981 | Toppins et al. | 280/154 |
| 4,427,208 | A | * | 1/1984 | Jurges | 280/848 |
| 4,659,130 | A | * | 4/1987 | Dimora et al. | 296/180.1 |
| 4,817,976 | A | * | 4/1989 | Kingsley | 280/154 |
| 5,074,573 | A | * | 12/1991 | Dick | 280/157 |
| 5,511,808 | A | * | 4/1996 | Rowland | 280/157 |
| 6,007,102 | A | * | 12/1999 | Helmus | 280/849 |
| 6,367,841 | B1 | * | 4/2002 | Matthew | 280/847 |
| 6,502,841 | B1 | * | 1/2003 | Skelcher | 280/156 |
| 6,648,373 | B2 | * | 11/2003 | Hawes | 280/854 |
| 6,799,782 | B2 | * | 10/2004 | Jain et al. | 280/848 |
| 6,886,862 | B2 | * | 5/2005 | Matthew | 280/848 |
| 7,185,920 | B2 | * | 3/2007 | Drummond | 280/851 |

* cited by examiner

*Primary Examiner*—Hau V Phan

(57) ABSTRACT

A fender mountable to a vehicle having a wheel. The fender includes a mounting bracket mountable to the vehicle, a suspension component mechanically coupled to the mounting bracket and a shield component mechanically coupled to the suspension component so as to be positionable substantially adjacent the wheel. The suspension component includes a deformable portion extending between the mounting bracket and the shield component. Upon a biasing force being exerted onto the shield component, the biasing force deforms the deformable portion so as to move the shield component relatively to the mounting bracket.

18 Claims, 7 Drawing Sheets

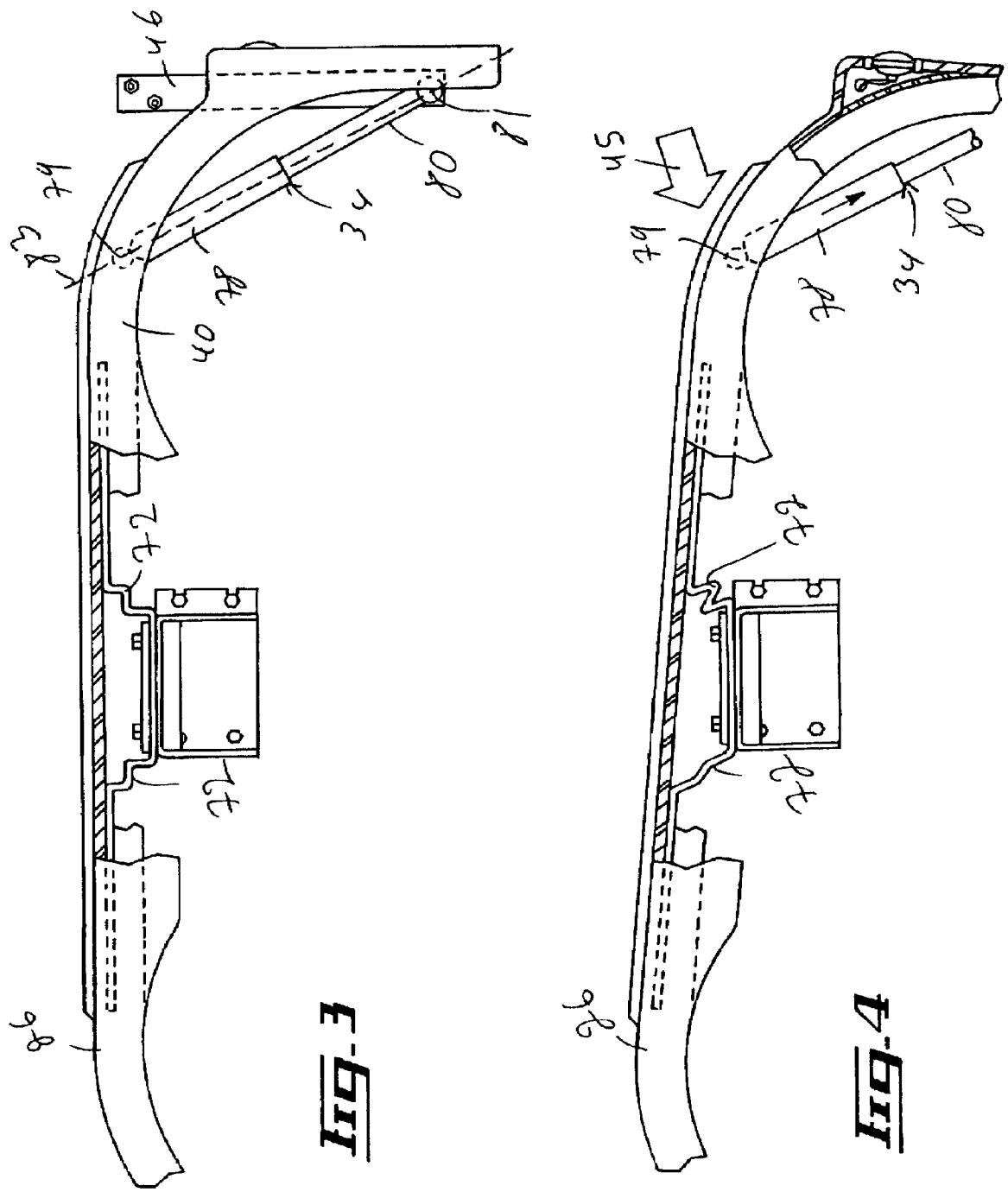

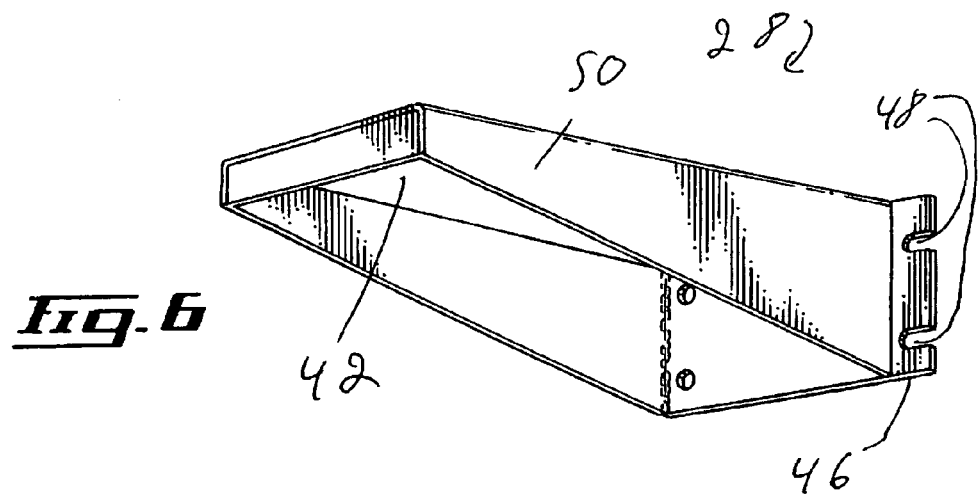
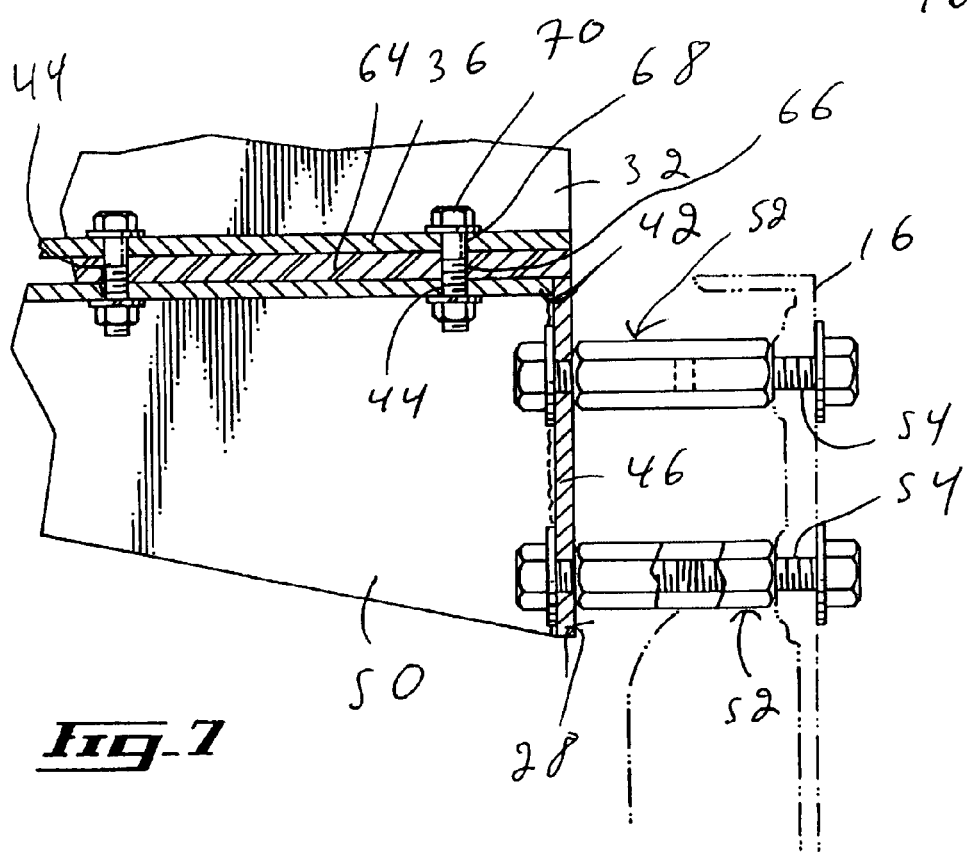

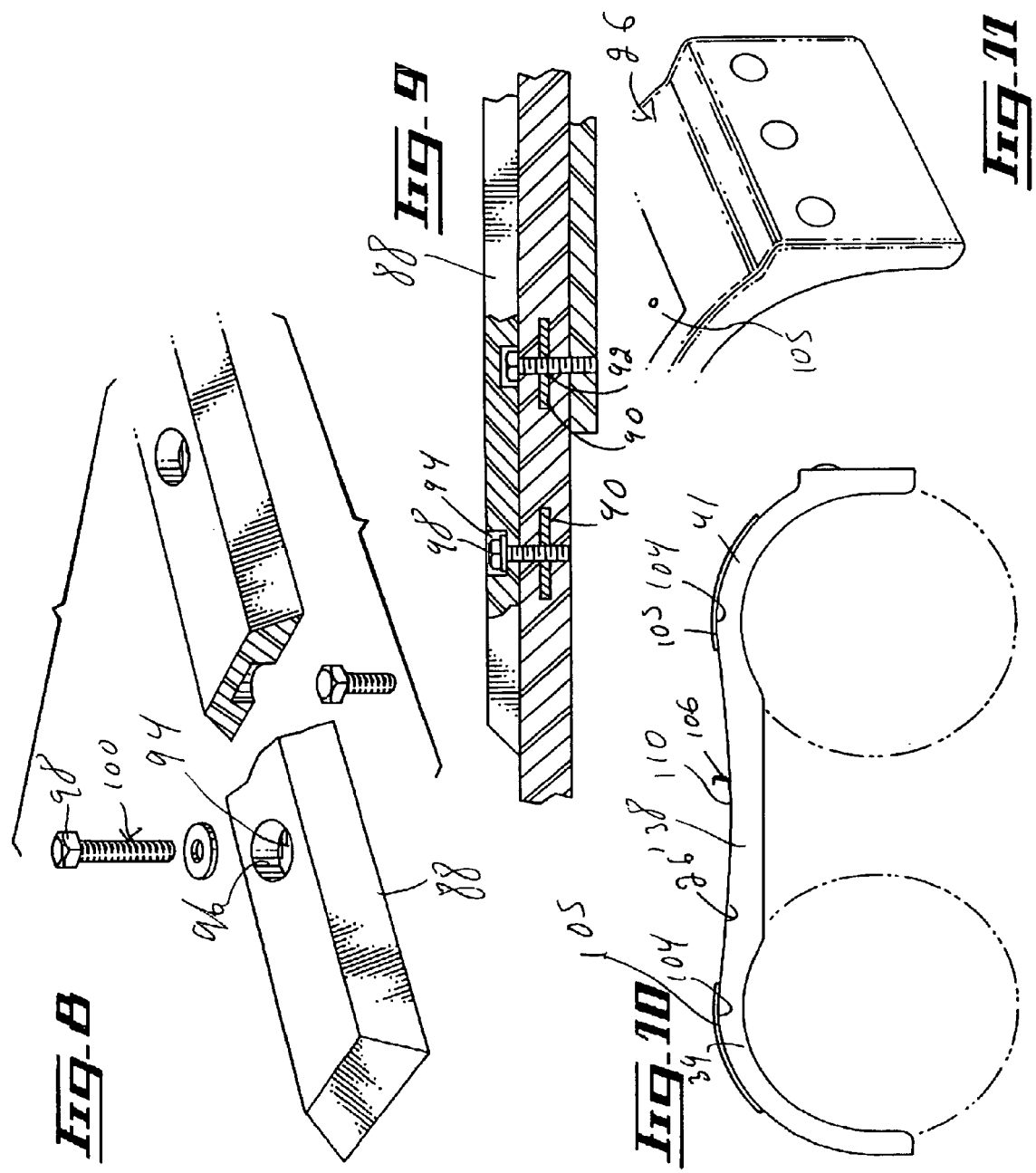

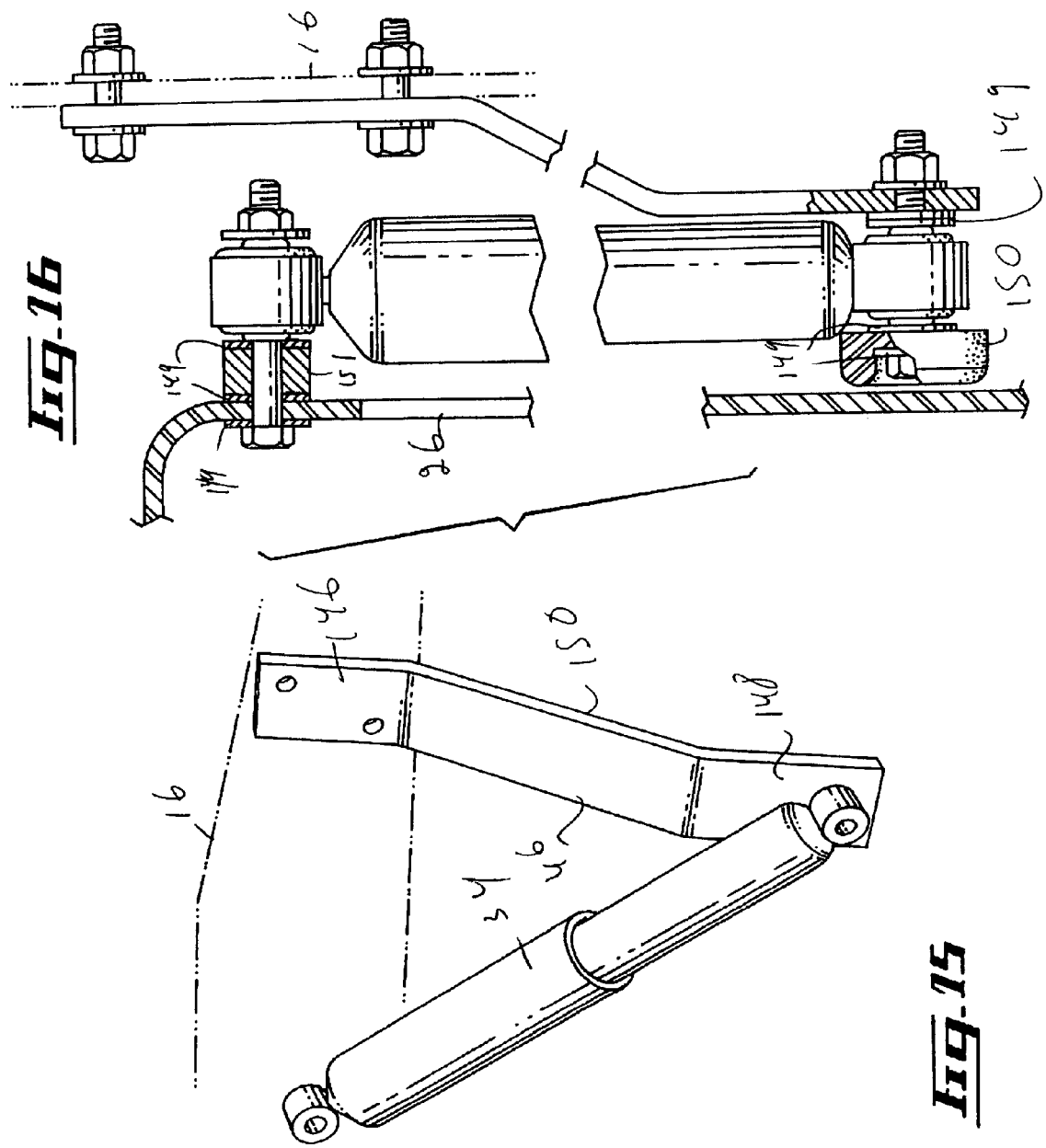

FENDER MOUNTABLE TO A VEHICLE

FIELD OF THE INVENTION

The present invention relates generally to the field of transportation is particularly concerned with a fender mountable to a vehicle.

BACKGROUND OF THE INVENTION

As is well known in the art, the tires of automotive vehicles are provided with a configured tread portion including a plurality of grooves and raised rubber ridges that provide driving traction with the ground. Although various tread designs are provided by the various tire manufactures, typically, all of these tread designs or configurations are adapted to provide an optimal compromise of tire wear, traction, stopping and nonskid capabilities and the like.

Larger vehicles such as trucks, tractors, trailers, semi-trailers and the like are typically correspondingly provided with relatively large tires. Such relatively large tires are, in turn, typically provided with relatively large grooves of such a size that appreciably sized stones, rocks or the like may potentially be readily embedded into these grooves. The potential for embedding appreciably sized stones or the like is compounded by the fact that these vehicles are typically relatively heavy and, hence, the tires grooves are compressed when they contact the roadway.

As the tires rotate during motion of the vehicle, the tire grooves dilate as they leave the roadway hence freeing the stones. Accordingly, as the tires rotate, the formerly embedded stones are freed to be hurled relatively violently. Although stones are considered to be more dangerous, the tires of relatively large vehicles may also hurl mud, clots of dirt and water in a similar manner.

Typically, the rocks, mud or other material is hurled in a generally upward and backward direction and, in the case of relatively large vehicles, relatively large objects may impact the surrounding environment including other vehicles, potentially breaking windshields, injuring drivers, deforming car bodies or the like.

When water is hurled, so-called "tread throw" is thrown from the rotating tires and may impact against surfaces of the vehicle, causing the throw droplets to fragment into smaller droplets of spray. This spray may potentially impair the visibility of drivers of these and other vehicles during wet conditions. This may potentially result in erratic directional control by drivers of following cars and trucks which are enveloped in this spray, especially from the large commercial trucks and tractor-trailer combinations which are moving ahead of them or beside them as they travel on the wet roadway. Drivers of these large vehicles also have difficulties seeing, via their rearview mirror, through the spray generated by their own vehicles, which occasionally causes accidents as they change lanes.

Furthermore, the hurling may also occur at the top of the tire, hence potentially hurling stones in a forward direction. Impinging stones may contact the tractor tanks and other equipment and potentially damage the latter.

In view of the potential hazards caused by hurling of different materials by relatively large vehicles, laws and regulations have been implemented in some regions requiring a protective safety device for intercepting hurled stones and the like. Accordingly, the prior art has shown some examples of impingement shields also called mudguards, splash guards or fenders.

A conventional impingement shield widely used takes the form vertically supported sheets of substantially resilient material such as rubber that hangs in the form of a curtain behind the tires of the relatively large vehicles for the purpose of intercepting such hurled objects. While such impingement shields have been widely accepted, they nevertheless suffer from numerous drawbacks. One such drawback is that they do not provide any shielding action for stones or objects that may be projected or hurled in an upward and/or forward direction. Furthermore, they may prove to be less than satisfactory for tread throw.

Typically, relatively large vehicles such as trucks, tractors, trailers, semi-trailers or the like are not provided with metallic fenders or mudguards for a variety of technical reasons. One such reason relates to the fact that the truck's chassis is usually manufactured by a different manufacturer than the one who makes the truck's body. Hence, it is generally difficult to know in advance the size of the tires that will be used, the location of the wheels relative to the truck's body, the problems associated with changing the large tires, etc.

Another main problem associated with the use of conventional metallic fenders on large vehicles such as trucks, trailers and the like relates to the fact that these conventional fenders may relatively easily be damaged when subjected to various impact stresses such as when the wheels move vertically as a result of a bump or other irregularity in the roadway or when the fender contacts stationary obstacles such as a sidewalk curb or the like. With the tight tolerances found in modern streamlined vehicles such as the heavy-duty trucks, there is little if any extra space between the tire and fender, hence compounding the risk of potentially damaging impacts on the fender.

The potential for damaging conventional fenders is particularly important in situations wherein, for example, a semi-trailer is being mechanically coupled to its tractor truck. In such instances, the forward portion of the trailer van or the like typically contacts the fender as the tractor truck back up to position its coupling section including the hitch adjacent or underneath the trailer van.

Accordingly, there exists a need for an improved fender mountable to a vehicle. It is a general object of the present invention to provide such an improved fender mountable to a vehicle.

SUMMARY OF THE INVENTION

In a first broad aspect, the invention provides a fender mountable to a vehicle having a wheel. The fender includes a mounting bracket mountable to the vehicle, a suspension component mechanically coupled to the mounting bracket and a shield component mechanically coupled to the suspension component so as to be positionable substantially adjacent the wheel. The suspension component includes a deformable portion extending between the mounting bracket and the shield component. Upon a biasing force being exerted onto the shield component, the biasing force deforms the deformable portion so as to move the shield component relatively to the mounting bracket.

Advantages of the present invention include that the proposed fender is particularly well-suited for reducing the potentially damaging consequences of hurling of stones and other materials resulting from the rotation of the tires of relatively large vehicles such as trucks, trailers, semi-trailers, tractors and the like. The proposed fender is adapted to provide an impingement shield against backward, forward and upward hurling.

Also, the proposed fender is particularly well-suited to be retrofitted or installed on a variety of relatively large vehicles through a set of quick and ergonomical steps without requiring special tooling or manual dexterity. Furthermore, the proposed fender is adapted to be mounted to a large variety of relatively large vehicles without requiring modification of the vehicles and with minimal risks of damaging the latter. The proposed fender may even be installed on relatively streamlined vehicles and on vehicles having a relatively low suspension component.

The proposed fender is particularly well-suited, although not limited to installation on the tandem or other types of wheels associated with conventional truck tractors used for hauling trailers and/or semi-trailers.

The proposed fender is designed so as to be subjected to various types of stresses, mechanical stresses including impact stresses with reduced risks of being damaged. Specifically, although not limited to, the proposed fender is adapted to be able to withstand the stresses associated with the mechanical coupling of a trailer van to a coupling section of an associated tractor trailers without being damaged.

Still, furthermore, the proposed fender is designed so as to be manufacturable using conventional materials and conventional forms of manufacturing so as to provide a fender that would be economically feasible, relatively long-lasting and relatively trouble-free in operation.

Yet, still furthermore, the proposed fender is designed so as to be aesthetically pleasing so as no to deter and even potentially improve the overall appearance of the vehicle.

Other advantages of some embodiments of the proposed fender include a reduction in the fuel consumption of the vehicle and an increase in the time interval at which the vehicle needs to be washed, both believed to be caused by a reduction in the turbulence present substantially adjacent the wheels of the vehicle.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

An embodiment of the present invention will now be disclosed, by way of example, in reference to the following drawings in which:

FIG. 3, in a partial side view with sections taken out, illustrates part of the fender shown in FIG. 1, the fender being shown in a non-biased configuration;

FIG. 4, in a partial side elevation view with sections taken out, illustrates the fender shown in FIG. 3, in a biased configuration, the fender being subjected to a biasing force such as that exerted by the trailer van shown in FIG. 2;

FIG. 6, in a perspective view, illustrates a mounting bracket part of the fender shown in FIGS. 1 through 5;

FIG. 7, in partial perspective view with sections taken out, illustrates the relationship between some of the components of the fender shown in FIGS. 1 through 5 and part of the vehicle frame as the fender is attached to the vehicle frame, the part of the vehicle frame being shown in phantom lines;

FIG. 8, in a partial perspective view with sections taken out, illustrates a portion of a sliding rail part of a fender in accordance with an embodiment of the present invention;

FIG. 9, in a partial longitudinal cross-sectional view with sections taken out, illustrates the sliding rail shown in FIG. 8 attached to corresponding components of the fender shown in FIGS. 1 through 8;

FIG. 10, in a schematic side elevation view with sections taken out, illustrates the configuration of a fender in accordance with an alternative embodiment of the present invention;

FIG. 11, in a partial rear perspective view with sections taken out, illustrates some of the visual characteristics associated with a fender in accordance with an embodiment of the present invention;

FIG. 15, in a perspective view, illustrates a shock-absorbing component part of the fenders illustrated in FIGS. 1 to 14; and FIG. 16, in a rear partial cross-section view, illustrates the attachment of the shock-absorbing component illustrated in FIG. 15 to the shield component and vehicle both shown in FIGS. 1 to 15.

DETAILED DESCRIPTION

Figure 1:
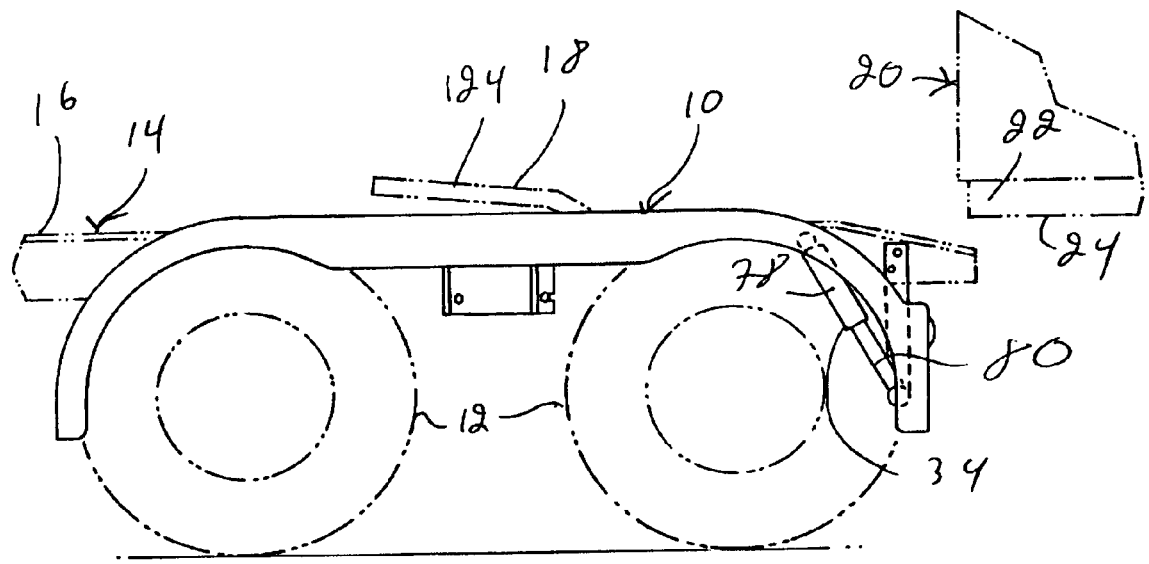
FIG. 1, in a partial side elevation view with sections taken out, illustrates a fender in accordance with an embodiment of the present invention, the fender being shown mounted over the tandem back wheels of a conventional tractor truck, the conventional tractor truck being shown about to be coupled to a conventional trailer van, the portions of the conventional tractor truck and conventional trailer van being shown in phantom lines.
Figure 2:
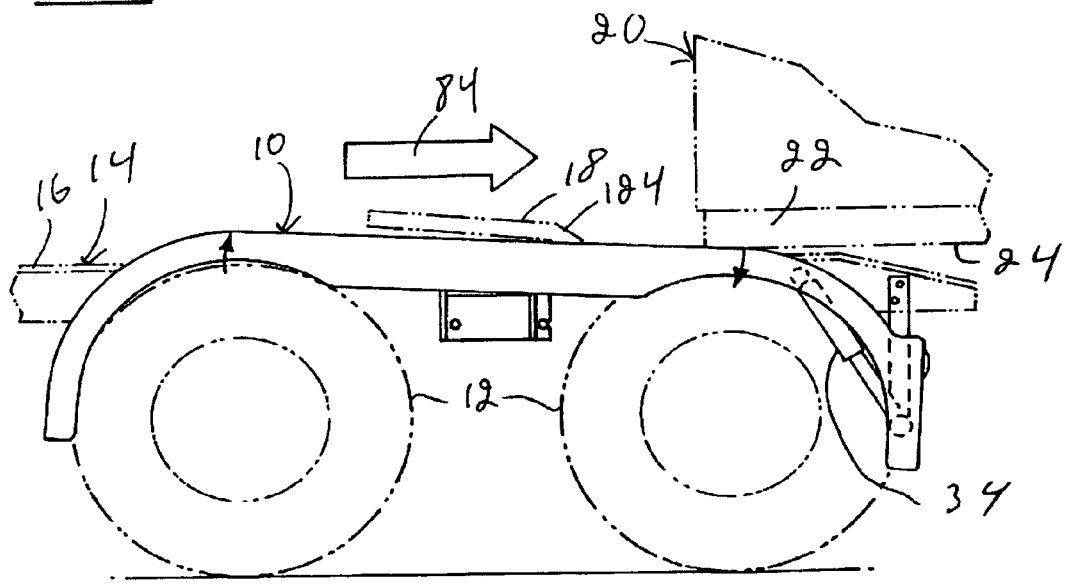
FIG. 2, in a partial side elevation view with sections taken out, illustrates a fender in accordance with an embodiment of the present invention, the fender being shown mounted over the tandem back wheels of a conventional tractor truck, the conventional tractor truck being shown as it is being coupled to the conventional trailer van with the trailer van overriding the fender.

Referring to FIG. 1, there is shown a fender in accordance with an embodiment of the present invention, generally indicated by the reference numeral 10. The fender 10 is shown mounted over a set of wheels 12 rotatably mounted to a conventional truck tractor 14 (only a portion of which is shown in FIGS. 1 and 2). The truck tractor 14 typically includes a truck frame 16 defining a truck frame rear section 18 adapted to be mechanically coupled to a container such as a trailer van 20 (only a portion of which is shown in FIGS. 1 and 2) or the like. The trailer van 20 typically includes a van frame 22 defining a van frame lower surface 24. The van frame 22 is typically coupled to the truck tractor 14 using a conventional coupling mechanism including a hitch 124 or the like.

It should be understood that although the fender 10 is shown used in a specific context of a truck tractor 14 used for hauling a trailer van 20, the fender 10 could be used on other vehicles such as, for example, relatively large vehicles including trucks, tractors, trailers, semi-trailers and the like without departing from the scope of the present invention. Also, the proposed fender 10 may be mounted over other wheels than the tandem wheels 12 shown in FIGS. 1 and 2 without departing from the scope of the present invention. Furthermore, the proposed fender 10 may assume other configurations than that shown in FIGS. 1 and 2, as illustrated, by way of example, in FIG. 10, without departing from the scope of the present invention.

Figure 5:
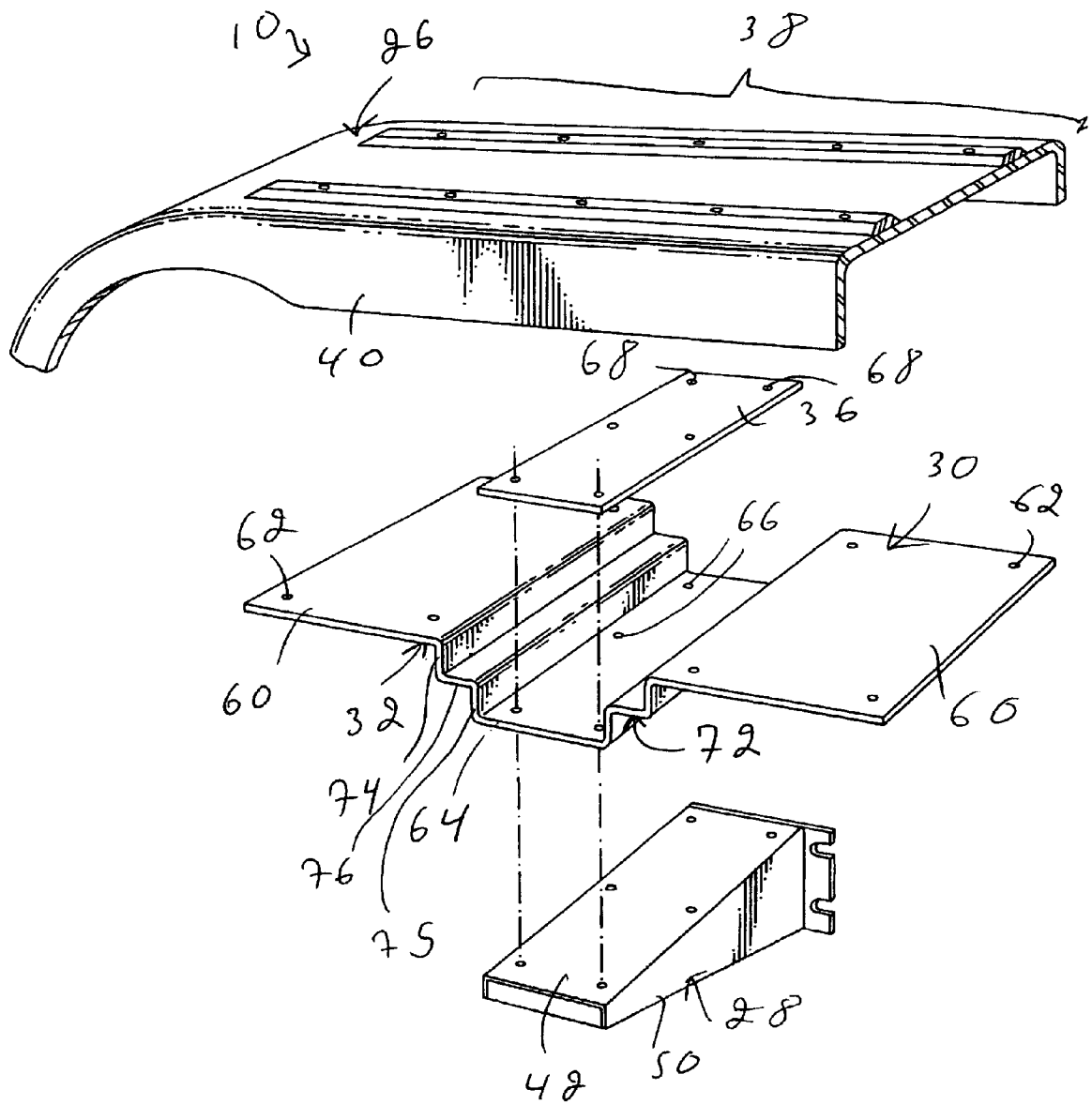
FIG. 5, in a partial exploded view with sections taken out, illustrates some of the components of the fender shown in FIGS. 1 through 4.

As illustrated more specifically in FIG. 5, the fender 10 typically includes a substantially elongated shield component 26 (only a portion of which is shown in FIG. 5). The shield component 26 is mountable to the frame of a vehicle, such as the truck or tractor frame 16 (not shown in FIG. 5), using a mounting bracket 28. Typically, the fender 10 is also provided with a suspension component 30 (only part of which is shown in FIG. 5) mechanically coupled to the mounting bracket 28 for allowing the shield component 26 to be resiliently displaced upon a biasing force being imparted thereon.

The suspension component 30, in turn, typically includes a deformable portion 32, for example substantially resiliently deformable, for supporting the shield component 26 and a shock-absorbing component 34 (not shown in FIG. 5). Typically, although by no means exclusively, an attachment plate 36 is used for securing the deformable portion 32 to the mounting bracket 28. In the embodiment of the invention shown in the drawings, the deformable portion 32 extends between the mounting bracket 28 and the shield component 26.

The shield component 26 is mechanically coupled to the suspension component 30 so as to be positionable substantially adjacent the wheels 12. Upon a biasing force being exerted onto the shield component 26, the biasing force deforms the deformable portion 32 so as to move the shield component 26 relatively to the mounting bracket 28.

The shield component 26 typically also includes a pair of longitudinally extending shield flanges 40 extending substantially perpendicularly and downwardly from the longitudinal peripheral edges of the shield main section 38.

Figure 13:
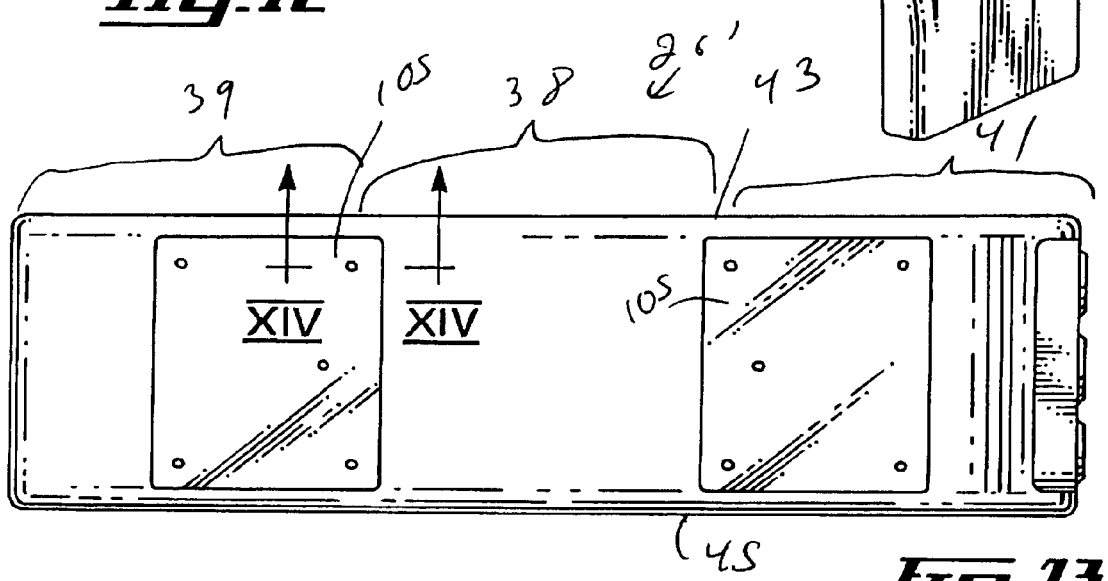
FIG. 13, in a top elevation view, illustrates the shield component shown in FIGS. 10 and 12.

Referring to FIG. 13 showing a shield component 26' in accordance with an alternative embodiment of the present invention, the shield component 26 is typically substantially elongated. The shield component 26 typically includes a pair of substantially longitudinally opposed generally longitudinally arcuate shield end sections 39 and 41 and a shield central section 38 extending between the shield end sections 39 and 41. The shield central section 38 is positionable in a substantially overriding relationship relatively to the wheels 12. The shield central section defines central section first and second lateral edges 43 and 45 extending between the shield end sections 39 and 41.

As seen in FIG. 13, the shield component 26' typically also includes a pair of longitudinally extending shield flanges 40 each extending substantially perpendicularly and downwardly from a respective one of the central section first and second lateral edges. In other words, the shield flanges 40 extend substantially perpendicularly from the central section first and second lateral edges 43 and 45 in a direction leading substantially towards the mounting bracket 28.

Figure 12:
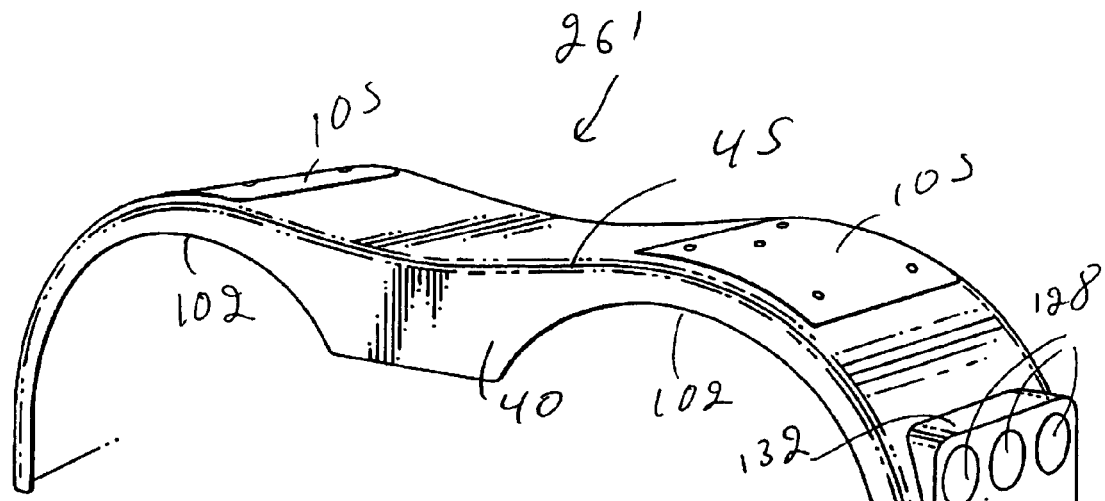
FIG. 12, in a perspective view, illustrates a shield component part of the fender shown in FIG. 10.

Referring to FIG. 12, the shield flanges 40 are typically provided with a flange recessed section 102 about the shield end sections 39 and 41. It should be understood that the configuration of the shield components 26 could vary without departing from the scope of the present invention depending on the configuration, number, size and position of the wheels being shielded, without departing from the scope of the present invention.

The shield flanges 40 improve the aesthetics of the fender 10 and help in reducing the air turbulence created by the wheels 12 when the vehicle moves. The shield flanges 40 extend in part of the space located between the two wheels 12 of a tandem wheel. This reduction in turbulence improves the fuel economy of the vehicle and reduces the quantity of water and mud that is sprayed onto the vehicle when the vehicle moves over wet or muddy roads.

Referring to FIGS. 6 and 7, the mounting bracket 28 typically includes a mounting section, for example taking the form of a bracket mounting plate 42. The mounting plate 42 is typically provided with mounting apertures 44 extending therethrough. The mounting plate 42 typically extends substantially forwardly in a substantially cantilevered fashion from a pair of mounting strips 46. The mounting strips 46 are provided with strip slots or apertures 48 extending therethrough. The mounting plate 42 is typically secured to the mounting strips 46 using a bracket peripheral flange 50.

As illustrated more specifically in FIG. 7, the mounting bracket 28 is mountable to a portion of a frame component such as the tractor frame 16 using bracket attachment components 52. The bracket attachment components 52 may take any suitable form including that of substantially elongated nut and bolt assemblies adapted to be inserted into corresponding strip apertures and slots 48 and corresponding attachment apertures 54 formed in the frame component 16. The bracket attachment components 52 are typically sized so as to also act as spacers for spacing the bracket strips 46 from the vehicle frame component 16 in order to provide a clearance or spacing there between. The spacing, in turn, prevents mechanical interference between the mounting bracket 28 and mechanical components 58 part of a conventional vehicle.

The deformable portion 32 typically includes at least one and preferably a pair of deformable portion-to-shield sections 60 securable to the under surface of the shield central section 38. Typically, each deformable portion-to-shield section 60 is provided with corresponding attachment apertures 62 extending therethrough for receiving corresponding conventional attachment components. Therefore, the deformable portion-to-shield section 60 is mechanically coupled to the shield component 26.

The deformable portion 32 is typically also provided with a deformable portion-to-mounting bracket section 64 for attachment to the mounting plate 42 part of the mounting bracket 28. Similarly, the deformable portion-to-mounting bracket section 64 is provided with corresponding attachment apertures 66 extending therethrough. Typically, the attachment plate 36 is further provided with corresponding attachment apertures 68 extending therethrough. As illustrated more specifically in FIG. 7, the attachment apertures 44, 66, and 68 are adapted to be put in register with each other and corresponding attachment components 70 are adapted to be used for securing the attachment plate 36, the deformable portion-to-mounting bracket section 64 and the mounting plate 42 together. Therefore, the deformable portion-to-mounting bracket section 64 is mechanically coupled to the mounting bracket 28.

Referring back to FIG. 5, there is shown that the deformable portion 32 further includes at least one linking section 72 extending between the deformable portion-to-shield section 60 and the deformable portion-to-mounting bracket section 64. The linking section 72 is configured and made out of a material such as to be substantially resiliently deformable so as to allow the shield component 26 to be moved relatively to the mounting bracket 28.

Therefore, the shield component 26 and the mounting bracket 28 are each removably attachable to the deformable portion 32. This allows manufacturing the shield component 26, mounting bracket 28 and deformable portion 32 separately from each other for later assembly. Also, this allows for the relatively easy replacement of damaged components of the fender 10, if required, and for fitting the fender 10 to vehicles having different dimensions and configurations with a relatively small inventory of components.

In the embodiment shown throughout the Figures, two linking sections 72 are substantially longitudinally spaced apart from each other and have a substantially step-like configuration. More specifically, the linking sections 72 each include a linking section first end segment 74 extending from the deformable portion-to-shield section 60, a linking section second end segment 75 extending from the deformable portion-to-mounting bracket section 64 and a linking section intermediate segment 76 extending between the linking section first and second end segments 74 and 75. The linking section intermediate segment 76 is angled relatively to the linking section first and second end segments 74 and 75. Typically, the linking section first and second end segments 74 and 75 are substantially perpendicular to the shield component 26, and therefore extend substantially vertically. Also, the linking section intermediate segment 76 is substantially perpendicular to the linking section first and second end segments 74 and 75 and is therefore substantially horizontal.

Also, in the embodiment shown throughout the Figures, the linking sections 72 are made out of substantially resiliently deformable material such as fiberglass having woven fibers. It should, however, be understood that the configuration and material from which the linking section 72 is made could vary without departing from the scope of the present invention.

In embodiments of the invention wherein two linking sections 72 are used, the durability of the fender 10 is improved with respect to embodiments of the invention wherein only one linking section 72 is present while allowing the movements of the shield component 26 to absorb shocks caused by the biasing forces. Also, the specific configuration of the linking sections 72 described hereinabove allows for relatively large deformations of the deformable portion 32 without causing damages to the deformable portion 32, while keeping the deformable portion 32 relatively easy to manufacture.

Referring to FIGS. 1 and 2, the suspension component 30 includes a shock-absorbing component 34 operatively coupled to the vehicle 18 and to the shield component 26 for damping movements of the shield component 26 relatively to said vehicle 18. This insures a relatively quiet operation of the fender 10 when the vehicle 18 is in movement. Also, this helps in preventing overshooting, in other words excessive displacement, in response to the application of the biasing force.

The shock-absorbing components 34 are preferably of the telescopic type, also known as cylinder-type, and include first and second shock-absorbing sections 78, 80. The shock-absorbing components 34 may be of the pneumatic or hydraulic-type. As illustrated more specifically in FIGS. 3 and 4, the shock-absorbing first and second sections 78, 80 are typically attached respectively to one of the shield flanges 40 and to a shock mounting bracket 46, the shock mounting bracket 46 being attached to the vehicle 18. The shock-absorbing components 34 are typically angled so as to provide an optimal shock-absorbing function. For example, in some embodiments of the invention, the shock longitudinal axis is angled at a shock-to-vertical angle relatively to a vertically extending line, the shock-to-vertical angle being of from about 0 degrees to about 30 degrees. It has been found that these angles provide advantageous shock absorbing properties while allowing to position the shock-absorbing component 34 so that the shock absorbing component 34 clears the various adjacent components of the vehicle 18.

The shock-absorbing component 34 is substantially elongated and defines a shock longitudinal axis 83. The shock-absorbing component 34 defines substantially opposed shock first and second end portions 79, 81, the shock first end portion 79 being attached one of the shield flanges 40 and the shock second end portion being attached to the shock mounting bracket 46.

Referring to FIGS. 15 and 16, in some embodiments of the invention, the shock mounting bracket 46 is substantially Z-shaped and defines a shock bracket first end 146, an opposed shock bracket second end 148 and a shock bracket intermediate portion 150 extending therebetween. The shock bracket intermediate portion 150 spaces the shock absorbing component 34 from the truck frame 16. The shock-absorbing component 34 is attached to the shock bracket second end 148 and the shock bracket first end 146 is attached to the truck frame 16. This attachment of the mounting bracket 46 to the truck frame 16 and to the shock-absorbing component 34 is made in any suitable manner, such as for example through the use of nuts and bolts extending through suitably positioned apertures with washers 149 and spacers 151 suitably positioned to allow a rotation of the shock-absorbing component relatively to these nuts and bolts to allow the movements of the shield component 26 relatively to the vehicle 18. In some embodiments of the invention, rubber cushions 150 are provided between the shock-absorbing component 34 and either one or both the shield component 26 and the truck frame 16 for protecting the surface finish of the shield component 26 and the truck frame 16.

The shock-absorbing component 34 is substantially longitudinally deformable between an extended configuration (seen in FIG. 3, for example) and a retracted configuration (seen in FIG. 4, for example). The shock first and second end portions 79 and 81 are closer to each other when the shock-absorbing component 34 is in the retracted configuration than when the shock-absorbing component 34 is in the extended configuration. The shock-absorbing component 34 dissipates energy when the shock-absorbing component 34 is deformed between the extended and retracted configurations FIG. 3 illustrates a situation wherein the shield component 26 is deprived of biasing force being exerted thereon. Accordingly, the linking sections 72 are in their initial non-contact configuration.

FIG. 4 illustrates a situation wherein a biasing force (generally schematically represented by arrow 45) is exerted on the shield component 26. The biasing force 45 may be created by a situation, such as illustrated in FIG. 2, wherein the shield component 26 is put into contact with the frame lower surface 24 of the trailer frame 22 (for example when the tractor moves rearwardly, as indicated by arrow 84 during coupling of the tractor to the trailer) or any other situation. The biasing force 45 causes the linking section 72 located substantially adjacent the biasing force 45 to deform to a linking section compressed configuration while the opposed linking section 72 deforms to a linking section compressed configuration. Also, the shock-absorbing component 34, which is located adjacent the biasing force 45, deforms to a retracted configuration.

In other words, the deformable component 32, upon the biasing force 45 being exerted thereon, allows a rotation of the shield component 26 about a shield rotation axis, the shield rotation axis being substantially parallel a rotation axis of the wheels 12. This rotation caused configurational changes in the components of the suspension component 30.

Upon release of the biasing force 45, the resilient nature of the linking sections 72 and the recoil force generated by the shock-absorbing components 34 causes the shield component 26 to be biased back to its original configuration shown in FIG. 3.

The shield component defines a shield top surface 110. In some embodiments of the invention, the fender 10 includes a surface protecting component extending substantially outwardly from the top shield surface 110. The surface protecting component is made of a material that is substantially more wear-resistant than a material defining the shield top surface 110. In some embodiments of the invention, the surface protecting component is removably attachable to the shield component 26.

As illustrated more specifically in FIGS. 8 and 9, in some embodiments of the invention, the surface-protecting component takes the form of at least one and preferably two sliding rails 88 mounted thereon. These sliding rails 88 may be made out of any suitable material such as a material having a generally low friction coefficient. For example, the sliding rails 88 includes a substantially longitudinally extending strip of a material having a friction coefficient that is substantially smaller than a friction coefficient of the shield top surface 110. An example of such material is Teflon™.

The sliding rails 88 may be mounted to the shield component 26 in any suitable manner. In the example shown in FIGS. 8 and 9, the shield component 26 is provided with anchoring plates 90 embedded therein typically during the moulding of the fiberglass. Each anchoring plate 90 is provided with a corresponding plate threaded aperture 92 extending there through. The sliding rails 88 are provided with attachment apertures 94 extending therethrough. Each attachment aperture 94 is, in turn, provided with a head receiving recess 96 adjacent thereto for receiving the head 98 of a corresponding attachment component such as a bolt 100.

In an alternative embodiment of the invention shown in FIG. 10, the shield central section 38 is recessed downwardly relative to the apex 104 of the shield end sections 39 and 41 so as to provide a clearance 106 there between. The clearance 106 prevents contact of objects such as the van frame lower surface 24 with the shield central section 38.

Figure 14:
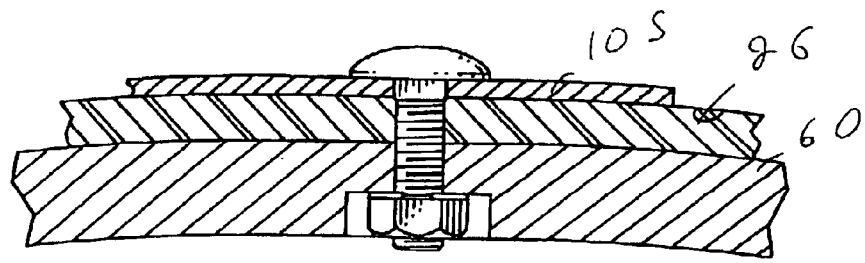
FIG. 14, in a partial cross-sectional view, illustrates the shield component shown in FIGS. 10, 12 and 13.

In these embodiments, the surface protecting component may take the form of substantially wear-resistant plates 105 each located substantially adjacent one the shield end sections 39 and 41. For example, the wear-resistant plates 105 are removably attached to the shield component 26 in any suitable manner and include a relatively hard material, such as stainless steel, for example. Referring to FIG. 14, the wear-resistant plates 105 may be attached to the shield component 26 using fasteners. In some embodiments of the invention, the fasteners also attach the wear-resistant plates 105 to the deformable portion-to-shield sections 60.

In the embodiments shown throughout the Figures, at least one of the shield end sections 100 is provided with light-emitting or reflecting means. Typically, at least one of the shield end sections 100 is provided with at least one and preferably three light-emitting components 128, each electrically coupled to a suitable power source using cables (not shown in the drawings) protectively housed in a corresponding housing 132 formed by the shield component 26.

Although the present invention has been described hereinabove by way of preferred embodiments thereof, it can be modified, without departing from the spirit and nature of the subject invention as defined in the appended claims.

What is claimed is:

1. A fender mountable to a vehicle having a wheel, said fender comprising:
   a mounting bracket mountable to the vehicle;
   a suspension component mechanically coupled to said mounting bracket; and
   a shield component mechanically coupled to said suspension component so as to be positionable substantially adjacent the wheel, said shield component being substantially elongated, said shield component including
   a pair of substantially longitudinally opposed shield end sections; and
   a shield central section extending between said shield end sections, said shield central section being positionable in a substantially overriding relationship relatively to said wheel, said shield central section defining central section first and second lateral edges extending between said shield end sections;
   said suspension component including a deformable portion extending between said mounting bracket and said shield component, said deformable portion including a deformable portion-to-mounting bracket section mechanically coupled to said mounting bracket, a deformable portion-to-shield section mechanically coupled to said shield component and a linking section extending between said deformable portion-to-mounting bracket section and said deformable portion-to-shield section, said linking section being substantially resiliently deformable so as to allow said shield component to be moved relatively to said mounting bracket;
   wherein upon a biasing force being exerted onto said shield component, said biasing force deforms said deformable portion so as to move said shield component relatively to said mounting bracket.

2. A fender as defined in claim 1, wherein
the wheel is rotatable about a wheel rotation axis; and
said deformable portion, upon said biasing force being exerted thereon, allows a rotation of said shield component about a shield rotation axis, said shield rotation axis being substantially parallel to the wheel rotation axis.

3. A fender as defined in claim 1, wherein
said shield component is substantially elongated;
said deformable portion includes
   a pair of substantially longitudinally spaced apart deformable portion-to-shield sections each mechanically coupled to said shield component; and
   a pair of linking sections each extending between said deformable portion-to-mounting bracket section and a respective one said deformable portion-to-shield sections, said linking sections each being substantially resiliently deformable so as to allow said shield component to be moved relatively to said mounting bracket.

4. A fender as defined in claim 1, wherein said linking section has a substantially step-like configuration.

5. A fender as defined in claim 4, wherein said linking section includes a linking section first end segment extending from said deformable portion-to-shield section, a linking section second end segment extending from said deformable portion-to-mounting bracket section and a linking section intermediate segment extending between said linking section first and second end segments, said linking section intermediate segment being angled relatively to said linking section first and second end segments.

6. A fender as defined in claim 5, wherein said linking section first and second end segments are substantially perpendicular to said shield component and said linking section intermediate segment is substantially perpendicular to said linking section first and second end segments.

7. A fender as defined in claim 1, wherein said shield component and said mounting bracket are each removably attachable to said deformable portion.

8. A fender as defined in claim 1, wherein said suspension component includes shock-absorbing component operatively coupled to said vehicle and to said shield component for damping movements of said shield component relatively to said vehicle.

9. A fender as defined in claim 8, wherein said shock-absorbing component includes a cylinder-type shock-absorbing component defining substantially opposed shock first and second end portions, said cylinder-type shock-absorbing component being substantially elongated and defining a shock longitudinal axis, said cylinder-type shock-absorbing component being substantially longitudinally deformable between an extended configuration and a retracted configuration, said shock first and second end portions being closer to each other when said cylinder-type shock-absorbing component is in said retracted configuration than when said cylinder-type shock-absorbing component is in said extended configuration, said cylinder-type shock-absorbing component dissipating energy when said cylinder-type shock-absorbing component is deformed between said extended and retracted configurations.

10. A fender as defined in claim 9, wherein said shock longitudinal axis is angled at a shock-to-vertical angle relatively to a vertically extending line, said shock-to-vertical angle being of from about 0 degrees to about 30 degrees.

11. A fender as defined in claim 1, wherein said shield component defines a shield top surface, said fender further comprising a surface protecting component extending substantially outwardly from said top shield surface, said surface protecting component being made of a material that is substantially more wear-resistant than a material defining said shield top surface.

12. A fender as defined in claim 11, wherein said surface protecting component is removably attachable to said shield component.

13. A fender as defined in claim 11, wherein said surface protecting component includes a substantially longitudinally extending strip of a material having a friction coefficient that is substantially smaller than a friction coefficient of said shield top surface.

14. A fender as defined in claim 11, wherein said surface protecting component includes a substantially wear-resistant plate located substantially adjacent one of said shield end sections.

15. A fender as defined in claim 1, wherein said shield component includes a substantially longitudinally extending shield flange extending substantially perpendicularly from one of said central section first and second lateral edges, said shield flange extending in a direction leading substantially towards said mounting bracket.

16. A fender as defined in claim 1, wherein at least one of said shield end sections is substantially longitudinally arcuate.

17. A fender as defined in claim 16, wherein said shield end sections each define a respective apex, said shield central section being substantially downwardly recessed relatively to said apexes.

18. A fender as defined in claim 1, wherein said mounting bracket includes a mounting section attachable to said vehicle and a deformable portion supporting section extending from said mounting section, said deformable portion supporting section extending in a substantially cantilevered relationship relatively to the vehicle when said fender is mounted to said vehicle, said fender further comprising a spacer mountable between said mounting bracket and said vehicle for spacing said mounting bracket from said vehicle.

* * * * *